United States Patent [19]
Eastman et al.

[11] Patent Number: 5,446,716
[45] Date of Patent: Aug. 29, 1995

[54] LASER POWER CONTROL IN AN OPTICAL RECORDING SYSTEM TO COMPENSATE FOR MULTIPLE SYSTEM DEGRADATIONS

[75] Inventors: Clarke K. Eastman; James A. Perconti, both of Rochester; Gerald J. Smart, Penfield; Peter J. Spyra, Churchville, all of N.Y.

[73] Assignee: Eastman Kodak Company, Rochester, N.Y.

[21] Appl. No.: 179,394

[22] Filed: Jan. 10, 1994

[51] Int. Cl.⁶ .................................................. G11B 7/00
[52] U.S. Cl. ......................................... 369/54; 369/116; 369/53; 369/44.29; 369/44.35; 369/124
[58] Field of Search ..................... 369/54, 58, 53, 116, 369/124, 32, 44.29, 44.27, 44.35, 47, 48, 49, 109, 111, 112; 359/208; 372/38

[56] References Cited

U.S. PATENT DOCUMENTS

| | | | |
|---|---|---|---|
| 4,239,942 | 12/1980 | Van Alem et al. | |
| 4,300,226 | 11/1981 | Barnette et al. | 369/124 X |
| 4,627,038 | 12/1986 | Abed et al. | 369/111 X |
| 4,755,977 | 7/1988 | Abed | 369/32 |
| 4,779,253 | 10/1988 | Getreuer et al. | 369/109 X |
| 4,817,073 | 3/1989 | Suzuki | |
| 4,942,567 | 7/1990 | Shiba | 369/124 |
| 4,965,782 | 10/1990 | Mathews | 369/48 |
| 4,975,895 | 12/1990 | Yanagi | 369/44.29 |
| 5,004,311 | 4/1991 | Peppers | 359/208 |
| 5,020,045 | 5/1991 | Smart et al. | 369/44.29 |
| 5,023,854 | 6/1991 | Satoh et al. | 369/32 |
| 5,084,849 | 1/1992 | Ishii et al. | 369/44.35 |
| 5,113,384 | 5/1992 | McDonald et al. | 369/44.29 |
| 5,138,593 | 8/1992 | Yokoyama | 369/44.29 |
| 5,146,443 | 9/1992 | Iwase et al. | 369/44.29 |
| 5,173,886 | 12/1992 | Satoh et al. | 369/32 |
| 5,187,696 | 2/1993 | Ishii et al. | 369/44.29 |
| 5,216,660 | 6/1993 | Iimura | 369/54 X |
| 5,218,588 | 6/1993 | Suzuki | 369/44.27 |
| 5,309,461 | 5/1994 | Call et al. | 372/38 |

OTHER PUBLICATIONS

Philips CDD521 Professional Compact Disc Recorder Service Manual, published by Service & Support Interactive Media Systems, Netherlands.

*Primary Examiner*—Georgia Y. Epps
*Assistant Examiner*—Muhammad N. Edun
*Attorney, Agent, or Firm*—Raymond L. Owens

[57] ABSTRACT

The present invention provides an apparatus and method for controlling laser power in an optical recording system in the presence of multiple system degradations. A recording system in accordance with the present invention includes an optical source for supplying an incident write signal to an optical medium, such that data may be recorded on the medium during an incident Write pulse as a mark having a distinct reflectivity; a structure for detecting a reflection of the incident write signal from the medium to provide a reflected write signal; means for generating a mark formation effectiveness signal from a reflected write pulse in the reflected write signal, to provide an indication of the quality of the mark; means for generating an error signal from the mark formation effectiveness signal and a target value of said mark formation effectiveness signal; and means for controlling a write power level of the optical source by providing a partial correction of a first type of variation in the error signal and a full correction of a second type of variation in the error signal. The first type of variations may be due to high frequency system degradations such as laser defocus and optical media tilt, while the second type of variation may be due to low frequency variations, such as changes in optical source wavelength or media sensitivity.

20 Claims, 6 Drawing Sheets

LASER POWER CONTROL IN AN OPTICAL RECORDING SYSTEM TO COMPENSATE FOR MULTIPLE SYSTEM DEGRADATIONS

CROSS REFERENCE TO RELATED APPLICATIONS

The present invention is related to the following U.S. patent applications: "Write Verification In An Optical Recording System By Sensing Mark Formation While Writing", Ser. No. 08/179,472; "Laser Power Control In An Optical Recording System Using Partial Correction Of Reflected Signal Error", Ser. No. "Method And Apparatus For Focusing A Recording Light Beam On A Recording Medium", Ser. No. 08/179,471; and "Method And Apparatus For Maintaining A Recording Light Beam In An On-track Position On A Recording Medium", Ser. No. 08/179,474, all filed concurrently with the present application, assigned to the assignee of the present invention, the disclosures of which are incorporated herein by reference.

FIELD OF THE INVENTION

The present invention relates to optical data recording. More particularly, the present invention relates to an improved optical recording system and method which uses a reflected optical write signal to control optical source power.

DESCRIPTION OF THE PRIOR ART

In optical data recording, an optical source, typically a laser, generates a write signal which is used to record data on an optical medium. To ensure proper data recording, it is important to maintain the laser output at an appropriate power level. A commonly-used technique for determining an initial optimal laser write power involves allocating a section of a recordable medium, such as a recordable compact disk (CD), for power calibration measurements. Several practice recordings are made in this section using a range of laser powers. The practice recordings are read back, and the write power level which produced the best recording quality is selected as optimal. The optimal power level is then used to record actual data in other sections of the CD.

In most recording systems, however, the optimal write power will not remain constant, but will instead need to be adjusted as various system parameters fluctuate with, for example, time or temperature. One technique for continuously maintaining an optimal write power involves monitoring a reflection of the write signal from the medium while data is being recorded. Systems which monitor the reflected write signal may be generally referred to as direct read during write (DRDW) systems. Certain characteristics of the reflected write signal, including, for example, the reflected signal peak voltage level, indicate the quality of the mark formed, and can therefore be used to determine if the laser write power level needs to be adjusted. These reflected signal characteristics, as well as any estimates or transformations thereof, will be generally referred to herein as mark formation effectiveness (MFE) signals. During calibration, an optimal value of an MFE signal can be determined, and a servo loop may be used during actual data recording to adjust the laser write power when the MFE signal deviates from the optimal, or target, value. A version of this technique is utilized in, for example, the CDD521 optical disk writer manufactured by Phillips Corporation.

Currently available laser power control techniques, however, suffer from a number of significant problems. Several of these problems, such as MFE signal sensitivity to reflected signal magnitude, media type, sample timing and write speed, are described in greater detail in the above-cited U.S. patent application Ser. No. 08/179,472. In addition, prior art laser power control techniques fail to recognize that different types of system degradations may require different laser power control strategies. Prior art laser power control techniques are typically designed to maintain an MFE signal at a predetermined target level without regard to the different effects of various system degradations. Certain types of system degradations, such as laser defocus, result in relatively high frequency variations in the MFE signal, with time constants on the order of milliseconds. For these high frequency degradations, a partial correction of the MFE signal error may yield higher quality recorded data than either a constant laser power or a laser servo which maintains the MFE signal at its target value. Other types of degradations, such as temperature-related laser wavelength shift combined with a recording medium in which sensitivity varies with wavelength, result in significantly slower variations in the MFE signal, with time constants on the order of seconds or minutes. For these low frequency degradations, a laser power control strategy which maintains the MFE signal at its target value may be optimal. Prior art techniques which simply maintain an MFE signal at a target value for all types of system degradations using, for example, a single high gain servo loop, may be inadequate to simultaneously compensate for all of the different degradations which may be typically encountered.

As is apparent from the above, a need exists for laser power control techniques which can provide improved simultaneous compensation for different types of recording system degradations.

SUMMARY OF THE INVENTION

The present invention provides an apparatus and method for controlling laser power in an optical recording system in the presence of multiple system degradations. The recording system of the present invention provides improved laser power control in part by permitting partial correction for high frequency system degradations and full correction for low frequency system degradations.

In accordance with one aspect of the present invention, a recording system is provided which includes an optical source for supplying an incident write signal to an optical medium, such that data may be recorded on the medium during an incident write pulse as a mark having a distinct reflectivity; means for detecting a reflection of the incident write signal from the medium to provide a reflected write signal; means for generating a mark formation effectiveness signal from a reflected write pulse in the reflected write signal, to provide an indication of the quality of the mark; means for generating an error signal from the mark formation effectiveness signal and a target value of said mark formation effectiveness signal; and means for controlling a write power level of the optical source by providing a partial correction of a first type of variation in the error signal and a full correction of a second type of variation in the error signal. The first type of variation may be due to high frequency system degradations such as laser defocus and optical media tilt, while the second type of variation may be due to low frequency variations, such as changes in optical source wavelength or media sensitivity.

ADVANTAGES

As a feature of the present invention, laser power may be efficiently controlled in the presence of multiple simultaneously-occurring system degradations which produce distinct variations in an MFE signal. For example, partial correction of the reflected signal error may be provided for certain types of degradations using a high speed servo loop with a variable loop gain. This partial error correction is well-suited to controlling laser power in the presence of system degradations such as laser defocus and tilt. Full correction for other types of degradations, such as variation in laser wavelength with temperature, may then be provided using a second servo with a peak sampler and means for restoring the peaks to an MFE target value.

As another feature of the present invention, the laser power control may advantageously include a limiter in order to, for example, limit the contribution of an MFE error signal servo to total laser power. The limit may be updated as laser properties change using, for example, an incident write power detector. The total laser power can thereby be directly and accurately controlled, and the danger of damaging the laser is minimized.

Further features of the invention, its nature and various advantages will become more apparent from the accompanying drawings and following detailed description of the invention.

DETAILED DESCRIPTION OF THE PREFERRED EMBODIMENTS

Data is generally recorded on an optical medium, such as a recordable compact disk (CD), in the form of marks. A mark, also known as a pit, has a different reflectivity than the unmarked portions of the disk, or lands, and is formed using a write signal power level sufficient to alter the reflectivity of the medium. The marks and lands represent different binary logic levels within the recording data. In general, certain characteristics of the reflected write signal indicate whether or not the mark has been properly formed, or, in other words, whether the data has been properly recorded on the medium. The reflected write signal can therefore be used to control laser power based upon whether marks are being properly formed. Additional details of exemplary techniques for monitoring reflected signal characteristics are disclosed in the above-cited U.S. patent application Ser. No. 08/179,472.

Figure 1:
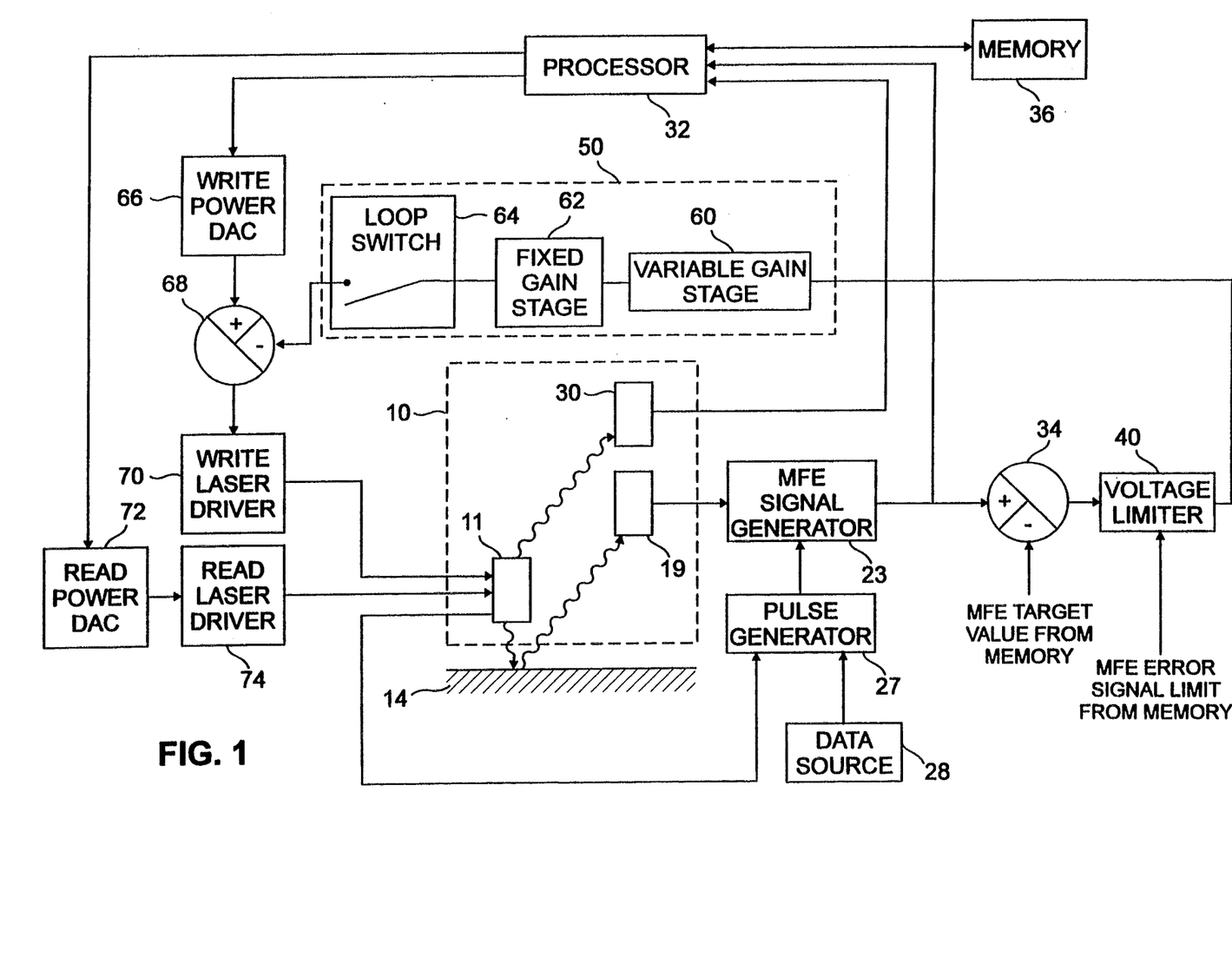
FIG. 1 is a block diagram of an exemplary optical recording system with laser power control in accordance with the present invention.

FIG. 1 is a block diagram of an exemplary optical recording system in accordance with the present invention. The recording system includes an optical head 10 for supplying an incident optical write signal used to record data on an optical recording medium 14. The optical head 10 includes an optical source 11 for generating the incident write signal. The optical source 11 may include, for example, a laser diode and a controller, and may be referred to herein simply as a laser. It should be understood, however, that the techniques of the present invention may be used with many other types of optical sources. The optical source 11 may be intensity-modulated by a stream of recording data, such as digital audio, video or other information, suitably encoded to facilitate recording on the optical medium. An exemplary data encoding technique well-known in the art is the eight-to-fourteen bit modulation (EFM) code used in CD recording. The incident optical signal includes at least one incident write pulse, corresponding to a logic level of the recording data. The optical medium 14 may be a recordable optical CD or any other suitable optical recording medium.

The optical write signal incident on optical medium 14 is reflected back from the medium toward an optical detector 19. The reflected signal may also be directed to additional optical detectors, not shown, which may drive, for example, focussing or tracking adjustment circuitry. The optical detector 19 may include a number of photodetectors for detecting the reflected optical signal and generating electrical signals therefrom in a known manner. Exemplary photodetectors suitable for use in the present invention include positive-intrinsic-negative (PIN) photodiodes and avalanche photodiodes. In systems operating at high write speeds, such as 6× or higher, the photodetectors may require response times on the order of several nanoseconds. A system write speed of 6× corresponds to six times the standard 4.32 Mbits/sec playback speed for an audio CD. The electrical signal at the output of optical detector 19 tracks the intensity modulation of the reflected optical write signal. The electrical signal generated by the optical detector 19 represents a reflected write signal which may be processed in subsequent electronic circuitry. The term "reflected write signal" as used herein will generally refer to the electrical signal at the output of the optical detector 19, rather than the optical signal at the detector input. The reflected write signal includes at least one reflected write pulse, corresponding to an incident pulse in the incident optical write signal.

A mark formation effectiveness (MFE) signal generator 23 receives the reflected write signal from the optical detector 19, and generates MFE signals indicative of mark formation quality. The pulse generator 27 receives a stream of data from a data source 28 and supplies suitably encoded recording data, in the form of a stream of write pulses, to optical source 11. The pulse generator 27 may also use the data stream from data source 28 to generate reference pulses for the MFE signal generator 23. The pulse generator 27 thus serves both as an interface between the data source 28 and the optical source 11, and as a reference pulse source for the MFE signal generator. In other embodiments, the data source 28 could directly drive the optical source 11, and the reference pulse generation function could be included within the MFE signal generator 23.

An exemplary MFE signal generator, which generates an estimate of the reflected write pulse normalized rate of change, is described in the above-cited U.S. patent application Ser. No. 08/179,472. As used herein, the term "rate of change" refers generally to the change in reflected write pulse voltage as a function of time. The term "decay rate" will be used herein to refer to a type of rate of change, characteristic of certain optical media, in which the reflected write pulse voltage decays from an initial peak value to a steady-state plateau value during mark formation. The reflected pulse decay rate is only one type of reflected signal characteristic which may be used to control laser write power by providing an indication of proper mark formation on the medium. Any of a number of other reflected signal characteristics may also be used as MFE signals in accordance with the present invention.

A portion of the incident write signal is supplied directly from optical source 11 to a front facet monitor (FFM) 30. The FFM 30 is an optical detector which monitors the incident write signal power level. The FFM 30 provides an output voltage which varies with the output power of the optical source. The FFM output voltage may be sampled between write pulses in a recording system processor 32, and used, for example, to control a read power level. The FFM 30 may also be used to calibrate the optical source output power level as a function of its input drive, as described in the above-cited U.S. patent application Ser. No. 08/179,476. The MFE signal generator 23 supplies an output MFE signal to a signal combiner 34 which measures the difference between the actual MFE signal and an optimal, or target, MFE signal value stored in a system memory 36. The difference between the actual and the target MFE signal values will be referred to herein as the MFE error signal. The output MFE signal may also be sampled in processor 32 and supplied to the memory 36 for storage. For example, during the above-described laser power calibration process, in which practice data recordings are made in one section of the recording medium in order to determine an initial optimal laser power, the MFE signals corresponding to various trial write powers may be stored in the memory 36. The target MFE signal value may be determined from the MFE signal values for the different trial power levels and measurements of resulting data quality, and then stored in the memory 36.

The MFE error signal from signal combiner 34 then passes through a voltage limiter 40. The voltage limiter 40 limits the contribution to total laser output power from the MFE error signal feedback. In general, a maximum value, or limit, for the MFE error signal may be stored within the memory 36. The output of the limiter 40 is a limited MFE error signal which will not exceed the stored maximum value. As a result, the laser peak output power will not be driven above a recommended maximum by the fed-back MFE error signal. An exemplary limiter circuit suitable for use in the present invention is described in the above-cited U.S. patent application Ser. No. 08/179,416.

An exemplary technique for providing partial correction of an MFE error signal is incorporated into the recording system of FIG. 1. It should be understood, however, that other techniques, such as restricting the MFE signal to a certain range of values, or a deadband, may also be used to provide partial MFE error correction. These techniques are described in greater detail in, for example, the above-cited U.S. patent application Ser. No. 08/170,476. In the exemplary partial correction technique of FIG. 1, the output of the voltage limiter 40 is supplied to a feedback circuit 50 of a servo loop which uses the MFE error signal, as limited by voltage limiter 40, to control optical source power. The servo loop with feedback circuit 50 may be referred to herein as a high speed servo loop, and is generally used to provide partial correction of MFE error in the presence of high frequency degradations.

The feedback circuit 50 includes a variable gain stage 60, a fixed gain stage 62, and a loop switch 64. The variable gain stage 60 may be a multiplying digital-to-analog converter (DAC) configured in a known manner to operate as a variable attenuator. An exemplary multiplying DAC is the Model AD7628 DAC available from Analog Devices. Other types of variable attenuators may also be used for the variable gain stage 60. As another alternative, the fixed gain stage 62 may be eliminated, and the entire loop gain supplied by the variable gain stage 60. In general, the variable gain stage 60 and the fixed gain stage 62 together provide a variable loop gain for the MFE error signal high speed servo loop. The variable and fixed gain stages should, in combination with the media response G1 defined below, be capable of providing loop gains in a suitable range, such as, for example, loop gains from about +0.5 to +10.0. It should be understood, however, that the appropriate loop gain value will typically vary depending upon, for example, the type of system degradation. The loop switch 64 may be in an open position during, for example, write power level calibration. The loop switch is placed in a closed position during normal system operation, when the laser power is continuously controlled using an MFE signal such as normalized pulse decay rate.

The write power for the optical source 11 is determined in part by a write control voltage generated by a write power DAC 66. The write power DAC controls a write laser driver 70 via signal combiner 68. The output of the write laser driver 70 is provided to optical source 11, along with the output of a read laser driver 74 generated in response to a read control voltage from a read power DAC 72. The optical source 11 also receives recording data, in the form of a series of write pulses, from the pulse generator 27. The optical source 11 generates an incident optical write signal including a number of incident write pulses suitable for recording data on the optical medium 14. Both the write power and read power DACS 66, 72, respectively, may be controlled by processor 32 using, for example, write and read control voltage values stored in the system memory 36. A nominal write control voltage value is typically determined during write calibration, and an appropriate read control voltage value may be determined by sampling the FFM 30 between write pulses.

During normal system operation, loop switch 64 is closed and the laser read and write power levels are controlled by the fed-back MFE error signal. When loop switch 64 is closed, the MFE error signal is amplified by the variable system loop gain provided by variable gain stage 60 in combination with fixed gain stage 62, and is then supplied to the signal combiner 68. The signal combiner 68 corrects the voltage generated by write power DAC 66 using the scaled MFE error signal, and the corrected voltage value is used to control the write laser driver 70. The write laser driver 70 then supplies an electrical signal to optical source 11 which is a function of the sum of the write DAC control voltage and the scaled MFE error signal. The servo loop operates continuously to provide changes in the optical source write power level which tend to reduce the MFE error signal.

As previously noted, prior art systems which use an MFE signal to control laser power are typically designed to maintain the MFE signal at a predetermined target value, corresponding to full correction of MFE error, regardless of the nature of the system degradations. However, partial correction of the MFE error reduces errors in written data when recording in the presence of certain system degradations. Exemplary techniques for providing partial correction of MFE error are disclosed in the above-cited U.S. patent application Ser. No. 08/179,416. The present invention, however, provides both a partial correction of MFE error for certain system degradations, and full correction of MFE error for others, such that the quality of recorded data is improved in the presence of simultaneous multiple system degradations. A variable gain servo loop, as shown in FIG. 1, is one way to achieve this partial correction.

An exemplary technique for providing partial correction of MFE error will now be described. It should be understood, however, that other partial correction techniques could also be used with the present invention. During write calibration, as described above, several different trial power levels are used to write practice data to a certain section of, for example, a recordable CD. The use of multiple optical source power levels in effect simulates degradations in a variety of different system parameters which affect mark formation. MFE signals are stored for each of the different trial write power levels. The resulting change in the MFE signal for a unit change in write control voltage is referred to herein as the media response G1. The media response G1 represents the gain of a signal path from the input of the write laser driver 70 to the output of the MFE signal generator 23, and will generally vary depending upon the type of optical media used within the system. The media response G1, as measured during write calibration, will be used to determine the appropriate gain for the servo loop.

The variable gain provided by the variable gain stage 60 in conjunction with the fixed gain stage 62 will be referred to herein as a gain G2. The total open loop gain G for the laser power control system, during laser power calibration, is then given by the product of the media response G1 and the variable gain G2, or $$G \times G2.$$

During actual data recording, when the loop switch 64 is closed, the resulting MFE signal for a given amount of simulated degradation is given by:

$$MFE_c = MFE_o/(1+G)$$

where $MFE_c$ is the closed loop MFE error signal, and $MFE_o$ is the open loop MFE error signal which would have resulted if the same system degradation had occurred with the loop open. In order to maintain loop stability, the value of G should be positive. The ratio of $MFE_c$ to $MFE_o$ is the quantity $1/(1+G)$, referred to herein as residual error.

The variable gain G2 is then set by determining the total open loop gain G required to provide a desired amount of partial correction, or residual error. The present invention thus recognizes that optimal power control for all types of system degradations is not achieved by maintaining the MFE signal at a constant value by, for example, using a high value of G such that the residual error is very small. As noted above, improved recorded data quality can be provided using partial correction based upon the MFE signal. A reduced gain servo loop is one way to achieve this partial correction. A variable gain feature allows this reduced gain to be achieved accurately for a variety of recording media. A desired amount of variable gain G2 is determined by solving the equation $G = G1 \times G2$ for G2 using the desired amount of residual error, corresponding to the quantity $1/(1+G)$, and the media response G1 measured during laser write power calibration.

An exemplary amount of partial correction suitable for use with recordable CD media involves setting G to a value of 1.5, such that the quantity $1/(1+G)$ yields a residual error value of 0.4. It has been determined that this amount of partial correction will provide improved quality of recorded data when recording in the presence of system degradations such as laser defocus, as compared to the full correction or constant laser power used in prior art techniques. In general, the desired amount of partial correction may vary depending upon the type of system degradations which must be controlled. For example, to provide optimal power control in the presence of system degradations such as surface contamination, a value of G greater than 1.5 may be preferable. By comparison, prior art techniques using full correction will typically use a high value of G, as noted above, in order to minimize residual error. An appropriate amount of partial correction for optimal power control in the presence of many different system degradations may be determined experimentally. Additional detail regarding alternative partial correction techniques may be found in U.S. patent application Ser. No. 08/179,476.

The laser power control of the present invention simultaneously provides partial MFE error correction for high frequency degradations such as high frequency laser focus error, also referred to herein as AC defocus or simply laser defocus, and full MFE error correction for low frequency degradations such as laser wavelength variation. It should be noted that laser focus error may be either high frequency or low frequency. AC focus error, or AC defocus, involves focus variations around an in-focus condition. Low frequency focus error, also referred to herein as DC focus error or DC defocus, involves an offset from an in-focus condition. DC focus error is typically corrected using a focus error servo technique, such as that described in the above-cited U.S. patent application Ser. No. 08/179,477. AC focus error may correspond to, for example, a residual high frequency error which remains uncorrected by a focus servo.

Figure 2A:
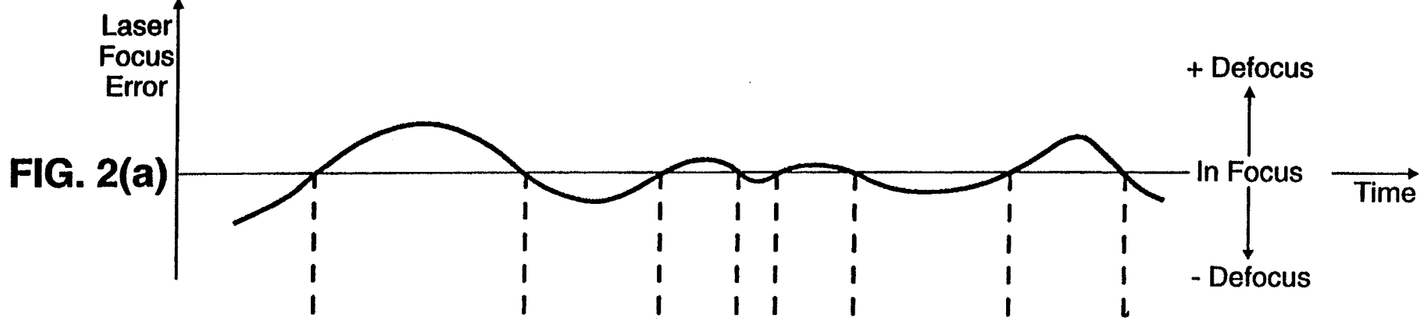
FIG. 2(a) is an exemplary plot of laser focus error as a function of time.

FIG. 2(a) illustrates one type of high frequency optical recording system degradation, AC laser focus error, as a function of time. The exemplary laser focus error shown is plotted such that the horizontal axis corresponds to an in-focus condition. The term "high frequency" as used herein refers to MFE error signal variations on the order of 10 Hz and above at a write speed of 6×. Recording system degradations which usually produce MFE error signal variations of relatively high frequency include AC laser focus error, which may be caused by shock and vibration, and tilt, which may be caused by non-flat media or skewed mounting of media on a spindle. The error signal variations produced by these degradations are generally at a higher frequency than other types of system degradations, referred to herein as low frequency degradations. Exemplary low frequency degradations include changes in laser wavelength with temperature combined with an optical medium in which sensitivity varies with wavelength, and variations in sensitivity along the surface of an optical medium.

Figure 2B:
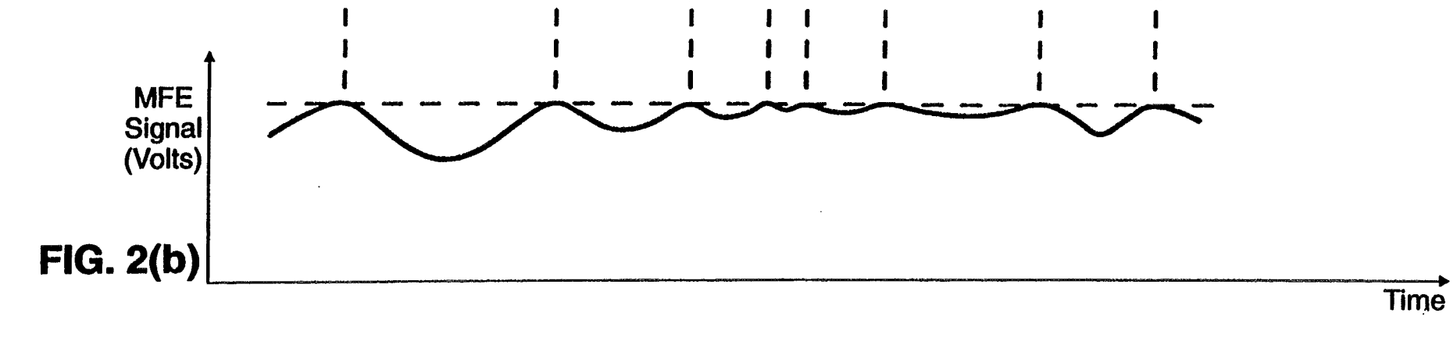
FIG. 2(b) is a plot of high frequency variations in an exemplary mark formation effectiveness (MFE) signal in response to the laser focus error of FIG. 2(a).

FIG. 2(b) shows the variations produced in an exemplary MFE signal at a constant write power as a result of the laser focus error shown in FIG. 2(a). In general, with all other conditions unchanged, both positive and negative laser focus errors tend to decrease the measured MFE signal. The resulting MFE peaks therefore correspond to an "in-focus" condition. In an MFE error signal servo loop which holds the MFE signal at a target value, the laser focus error may thus result in overcompensating the laser output power. U.S. patent application Ser. No. 08.179,476, discloses that the detrimental effect of high frequency degradations such as AC laser focus error may be better reduced by increasing laser power to partially, rather than fully, restore the MFE signal to its target value. However, this partial correction may not optimize laser power in the presence of other types of system degradations, such as the low frequency degradations described above. The present invention provides a more flexible laser power control approach by permitting partial compensation for certain types of degradations and full compensation for other types of degradations. As a result, optimal laser power may be maintained, resulting in higher quality written data when recording in the presence of multiple high and low frequency system degradations.

Figure 3A:
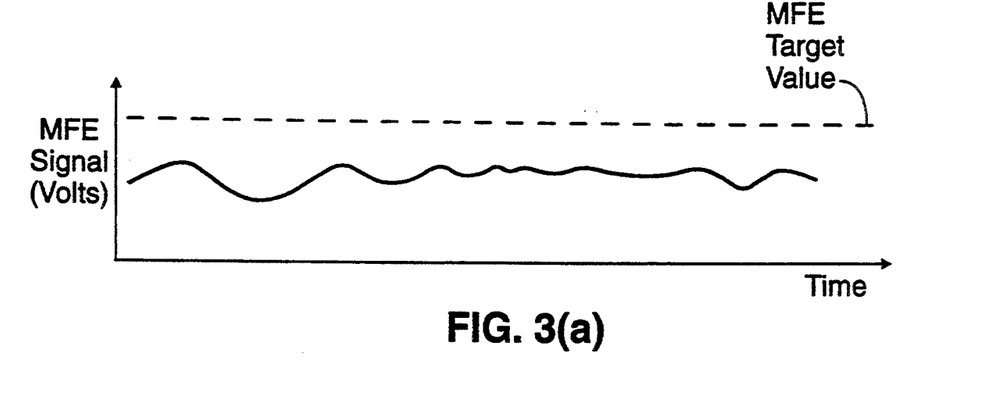
FIG. 3(a) is an exemplary plot of variations in an MFE signal, in the presence of multiple system degradations, at a constant write power level.
Figure 3B:
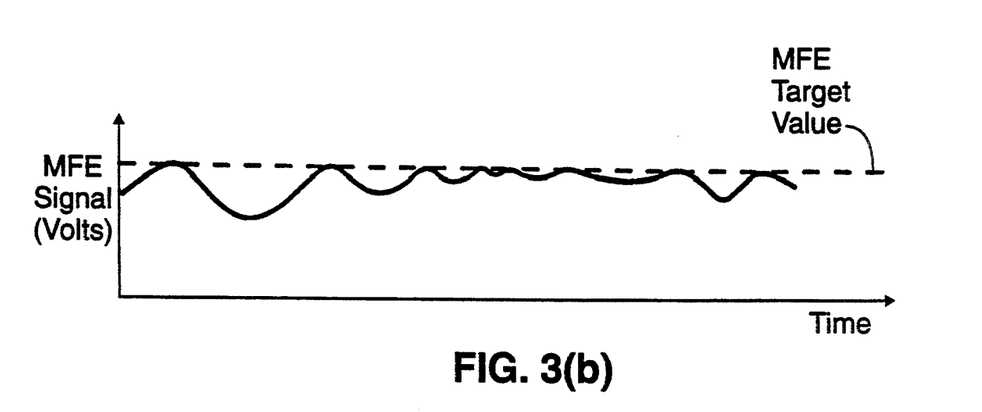
FIG. 3(b) shows the MFE signal variations of FIG. 3(a) after full correction for low frequency system degradations.
Figure 3C:
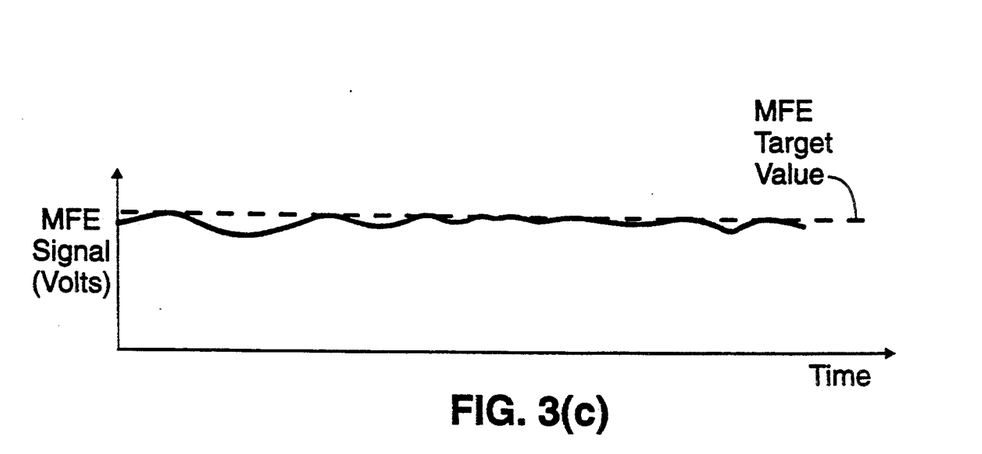
FIG. 3(c) shows the MFE signal variations of FIG. 3(a) after full correction for the low frequency degradations and partial correction for the high frequency variations, in accordance with the present invention.

FIG. 3 is a qualitative illustration of compensation for multiple system degradations in accordance with the present invention. FIG. 3(a) shows an exemplary MFE signal produced using a constant write power without a laser power control servo. The high frequency variations in the MFE signal may be due to, for example, laser focus error. The low frequency variations in the MFE signal are shown as a voltage offset from the desired MFE target value, such that the entire MFE signal shown is shifted downward away from the target value. FIG. 3(b) shows the result of using a full correction of the MFE error signal of FIG. 3(a) to correct for the low frequency system degradations, in accordance with the present invention. The full correction may be performed using, for example, a low speed servo, as will be described in greater detail below in conjunction with FIGS. 4, 5 and 6. As a result of the low speed full correction, the MFE signal is shifted upward such that the signal peaks, which correspond to an in-focus condition, are restored to the target value, but the high frequency variations in the MFE signal remain unaffected. FIG. 3(c) shows the result of using a high speed partial MFE signal correction for high frequency degradations, in addition to the low speed full MFE error correction for low frequency degradations as in FIG. 3(b). The low speed full correction reduces the voltage offset resulting from the low frequency degradations, and the high speed partial correction reduces the residual MFE signal variation due to the high frequency degradations.

Figure 4:
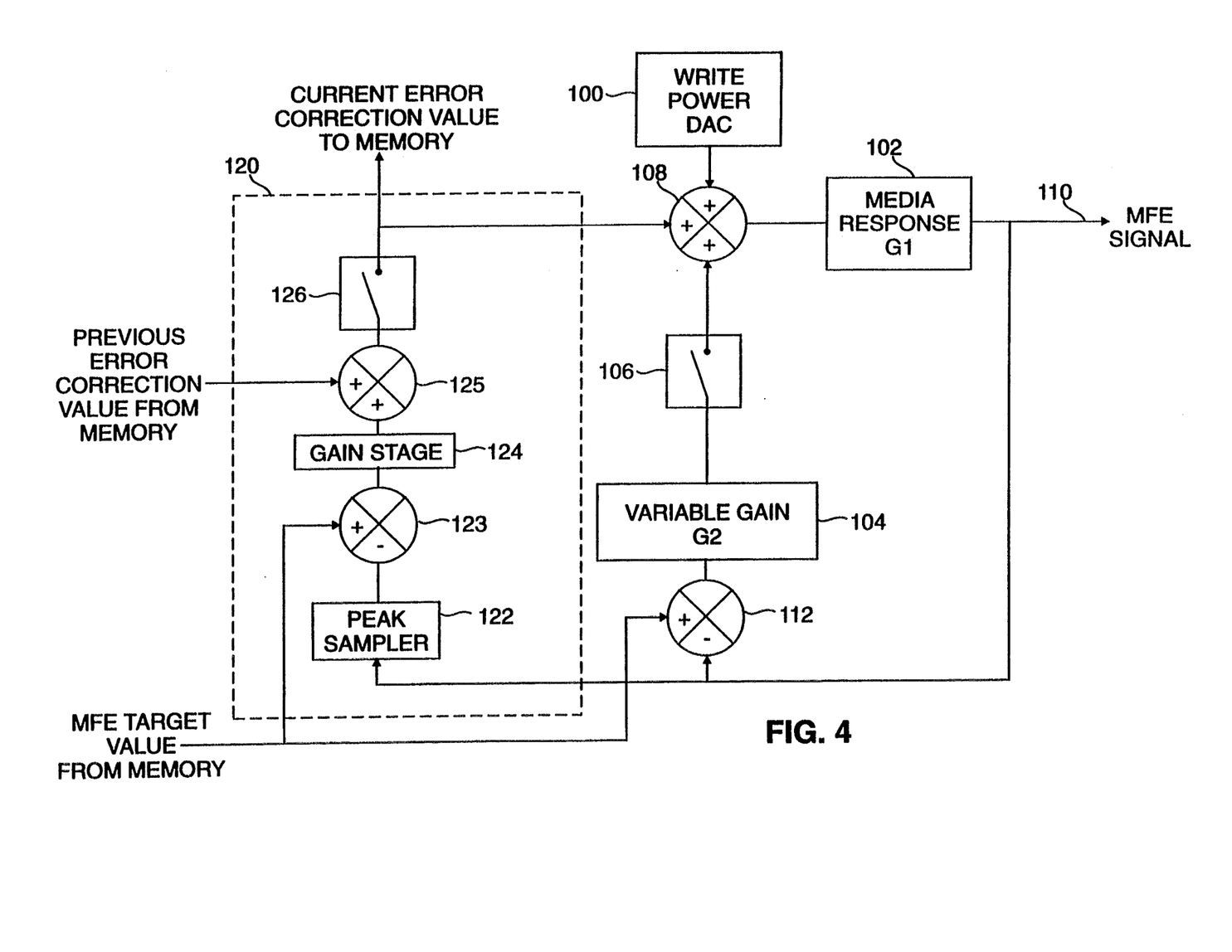
FIG. 4 is a block diagram of one embodiment of the present invention which uses low and high speed servo loops in order to provide complete and partial MFE error correction, respectively.

FIG. 4 is a block diagram of an exemplary laser power control system in accordance with the present invention. A laser write power DAC 100 corresponds to, for example, the write power DAC 66 of FIG. 1. A media response block 102 represents the gain response of a signal path in the recording system hardware from, for example, the write laser driver 70 input to the MFE signal generator 23 output. As noted above, the media response may be referred to as the gain G1, where G1 generally varies depending upon the type of recording hardware and optical media used, and is measured and stored during write calibration. The laser power control system includes a high speed servo loop including a variable gain 104, which may be 9.5 provided by the exemplary variable gain stage 60 in conjunction with the fixed gain stage 62, as shown in FIG. 1. The variable gain 104 is also referred to herein as the gain G2. As noted above, a single variable gain stage could be used to provide the variable gain G2. Any of a number of other well-known arrangements could also be used to provide the variable gain G2.

The media response 102, variable gain 104, and a loop switch 106 provide a high speed servo loop similar to that described in conjunction with FIG. 1 above. The output 110 of the media response 102 is an MFE signal, and an MFE error signal is generated in a signal combiner 112 as the difference between the MFE signal and an MFE target value stored, for example, in a system memory, such as memory 36 of FIG. 1. The MFE error signal is used to drive the high speed servo loop, and during normal operation is scaled by variable gain 104, and then subtracted in signal combiner 108 from the write control voltage provided by write power DAC 100. The operation of the system of FIG. 4, as described thus far, is similar to that of the system in FIG. 1. The exemplary high speed servo loop uses a variable gain such that partial correction of MFE error may be used to control laser power in the presence of certain types of system degradations. The variable gain of the high speed loop may be set during write calibration, in the manner described above and discussed in greater detail in U.S. patent application Ser. No. 08/179,476.

In accordance with one possible embodiment of the present invention, a low speed servo loop including a low speed feedback circuit 120 is used to provide full MFE error correction for other types of system degradations. The low speed feedback circuit 120 includes a peak sampler 122, a signal combiner 123, a gain stage 124, signal combiner 125, and a loop switch 126. Like the high speed loop switch 106, the loop switch 126 remains open for laser power calibrations, and is closed during normal circuit operation. The peak sampler 122 processes the MFE signal, including any high frequency content thereof, to locate peak levels. The MFE target value is then subtracted in signal combiner 123 to generate the peak MFE error. A scaled peak MFE error is generated by multiplying the peak MFE error value by a gain factor in gain stage 124. A current error correction value is then determined by adding, in signal combiner 125, the previous error correction value stored in memory to the scaled peak MFE error. The previous error correction value is the error correction value determined on a previous iteration of the low speed servo loop. The current error correction value is then stored in memory, to be used in the next iteration of the low speed loop, and supplied to signal combiner 108. In the signal combiner 108, a new control value is determined based upon the sum of the value from the write DAC 100 and the current error correction value. The low speed loop with low speed feedback circuit 120 serves to raise the peaks in the MFE error signal to a value of zero, which is equivalent to raising the peaks of the MFE signal to the target value as shown in FIG. 3(b). In general, the low speed loop updates the error correction value relatively slowly, on the order of every 1 msec at a 6× write speed, in order to maintain the MFE error signal peaks at a level of zero. The high speed loop operates much more quickly, with a response time on the order of 10 μsecs at a 6× write speed, and acts to partially correct MFE error variations caused by high frequency degradations. It should be noted that the exemplary system of FIG. 4 is only one possible embodiment of a recording system with laser power control in accordance with the present invention. Any of a number of alternative hardware implementations could also be used to provide simultaneous low speed full correction and high speed partial correction in accordance with the present invention.

The low speed feedback circuit 120 shown in FIG. 4, and its interaction with the high speed servo loop and MFE signal generator, may be implemented in software. The software can then be executed in a computer or microprocessor within the optical recording system, such as processor 32 in FIG. 1.

Figure 5:
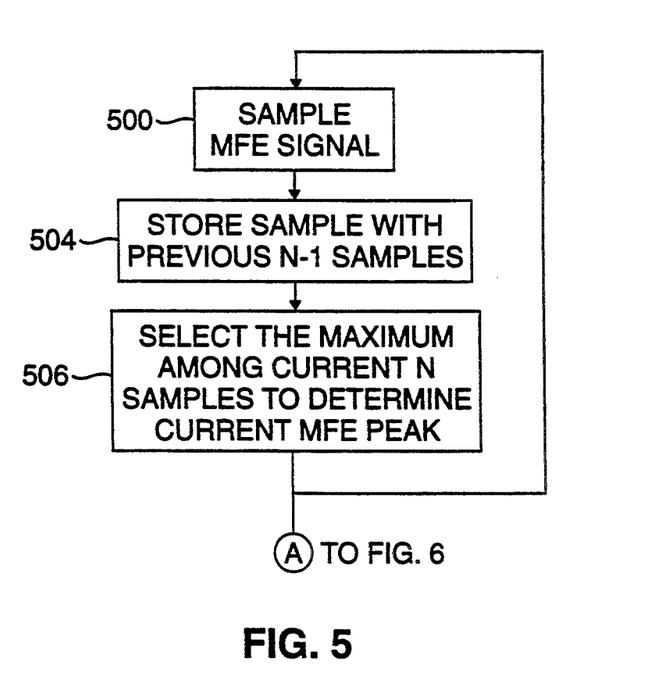
FIGS. 5 and 6 are flow charts of an exemplary set of processing steps suitable for implementing full correction for low frequency system degradations in the presence of high frequency degradations, in accordance with the present invention.
Figure 6:
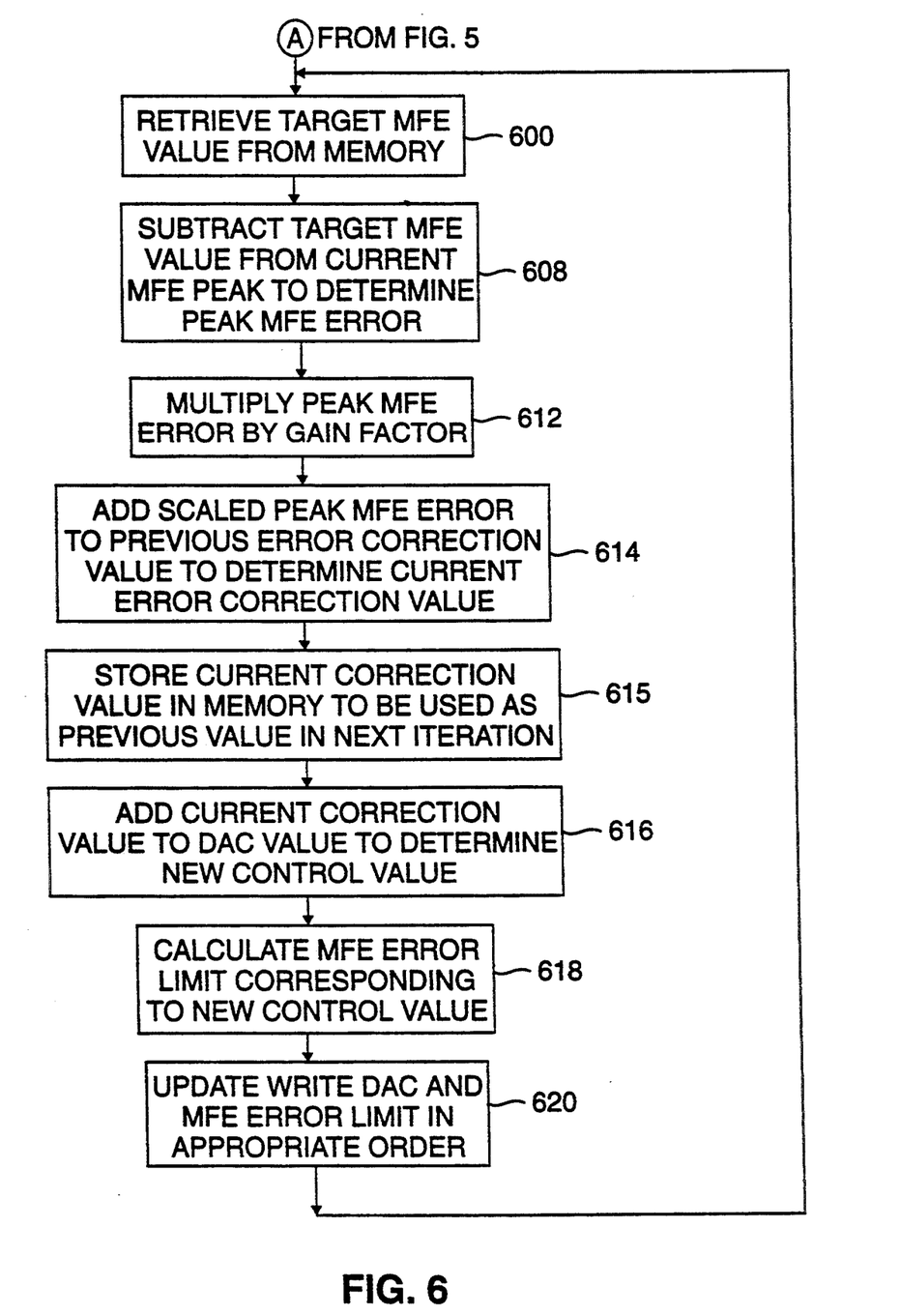

FIGS. 5 and 6 are flow charts showing an exemplary set of processing operations which implement the function of the low speed loop of FIG. 4. FIG. 5 shows an exemplary set of operations suitable for determining MFE signal peaks. In operation block 500, an MFE signal is sampled. The sampling may be performed using, for example, the processor 32 and an MFE signal from the MFE signal generator 23 of FIG. 1. The MFE signal is sampled in order to locate a peak MFE signal value. The resulting sample is then stored in, for example, memory 36 of FIG. 1 with the previous N−1 MFE sample values, as shown in operation block 504. The MFE signal may be sampled about every 1 msec at a 6× write speed, although the sampling period may vary considerably depending upon, for example, the type of system degradation. In operation block 506, a current MFE peak is found by taking the maximum sample value of the current N samples. The variable N is selected, along with an appropriate sample period, such that the desired MFE signal peaks are detected. In an exemplary embodiment, the value of N may be about 128 for a sample period of about 1 msec. Operation blocks 500 to 506 in FIG. 5 thus provide the function of the peak sampler 122 in FIG. 4. The operations in blocks 500 to 506 in FIG. 5 may be repeated, for example, every 1 msec at a 6× write speed.

FIG. 6 shows the low speed loop processing steps after the MFE peaks are sampled. The target MFE value is retrieved from memory and subtracted from the current peak MFE value in order to determine peak MFE error, as shown in operation block 608. The target value may be supplied from, for example, a system memory location such as memory 36 in FIG. 1. The operation block 608 thus provides the function of the signal combiner 123 of FIG. 4. The resulting peak MFE error is then multiplied by an appropriate gain factor, yielding a scaled peak MFE error. In order to provide full MFE error correction for low frequency-type system degradations, the gain factor used in block 612 will typically be low. For example, a gain factor on the order of 1.0 is suitable for use in the present invention. The scaled peak MFE error is added to the previous error correction value in order to determine a current error correction value, as shown in block 614. The current error correction value is then stored in memory to be used as the previous error correction value in the next iteration of the low speed loop.

The current error correction value is also added to the write DAC control voltage in order to determine a new control value, as shown in block 614. The new control value specifies a power level to which the laser source will be driven in order to provide full correction of MFE errors due to low frequency degradations. Before the write DAC is updated to reflect this new power level, the new control value should be compared to the maximum laser power limit, in order to avoid overdriving the laser. Subsequently, as shown in block 618, the new control value is also used to calculate a voltage limit for the MFE error signal. The MFE error voltage limit is used in, for example, voltage limiter 40 of FIG. 1 to limit the contribution of the MFE error signal to the total laser power such that the combination of the current write DAC value and the scaled MFE error cannot exceed the maximum laser power limit. If, for example, the new control value represents a higher laser power than the previous control value, the acceptable maximum MFE error signal will be reduced. The new control value may then be used to update the write DAC 100 and the MFE error limit stored in system memory. The write DAC 100 and the MFE error limit should be updated in an appropriate order to avoid the possibility of exceeding the maximum laser power before both updates are completed. Typically, when the write DAC is increased, the MFE error limit is decreased, and vice versa. In general, the order of update should be such that an update associated with a decrease in laser power is completed before an update associated with an increase in laser power. Additional iterations of the low speed loop are performed by repeating the operations in blocks 600 to 620.

It should be emphasized that the embodiments described above are exemplary only. Many variations may be made in the arrangements shown, including, for example, the means for providing partial correction of high frequency variations in MFE error, the means for providing full correction of low frequency variations in MFE error, and the type of MFE signal used. These and other alternatives and variations will be readily apparent to those skilled in the art.

| | PARTS LIST |
|---|---|
| 10 | optical head |
| 11 | optical source |
| 14 | optical recording medium |
| 19 | optical detector |
| 23 | MFE signal generator |
| 27 | pulse generator |
| 28 | data source |
| 30 | front facet monitor (FFM) |
| 32 | recording system processor |
| 34 | signal combiner |
| 36 | system memory |
| 40 | voltage limiter |
| 50 | servo loop feedback circuit |
| 60 | variable gain stage |
| 62 | fixed gain stage |
| 64 | loop switch |

-continued

PARTS LIST

| | |
|---|---|
| 66 | write power DAC |
| 68 | signal combiner |
| 70 | write laser driver |
| 72 | read power DAC |
| 74 | read laser driver |
| 91 | first amplifier |
| 92 | error signal input |
| 94 | second amplifier |
| 96 | voltage limit input |
| 100 | write power DAC |
| 102 | media response G1 |
| 104 | variable gain G2 |
| 106 | high speed loop switch |
| 108 | signal combiner |
| 110 | MFE signal output |
| 112 | signal combiner |
| 120 | low speed feedback circuit |
| 122 | peak sampler |
| 123 | signal combiner |
| 124 | gain stage |
| 125 | signal combiner |
| 126 | low speed loop switch |
| 500–506 | low speed servo operation blocks |
| 600–620 | low speed servo operation blocks |

What is claimed is:

1. An optical recording system for recording data on an optical recording medium, said system comprising:
   an optical source for supplying to said medium an incident write signal, said incident write signal including at least one incident write pulse, such that a logic level of said data may be recorded on said medium during said pulse as a mark having a distinct reflectivity;
   means for detecting a reflection of said incident write signal from said medium to provide a reflected write signal, said reflected write signal including a reflected write pulse corresponding to said incident write pulse;
   means for generating a mark formation effectiveness signal from said reflected write pulse, said mark formation effectiveness signal generator providing an indication of the quality of said mark;
   means for generating an error signal from said mark formation effectiveness signal and a target value of said mark formation effectiveness signal; and
   means for controlling a write power level of said optical source by providing a partial correction of a first type of variation in said error signal and a full correction of a second type of variation in said error signal.

2. The optical recording system of claim 1 wherein said first type of variation in said error signal results from a high frequency system degradation.

3. The optical recording system of claim 2 wherein said high frequency system degradation is a focus error of said optical source.

4. The optical recording system of claim 2 wherein said high frequency system degradation is a tilt of said optical medium in said recording system.

5. The optical recording system of claim 1 wherein said second type of variation in said error signal results from a low frequency system degradation.

6. The optical recording system of claim 5 wherein said low frequency system degradation is a change in a wavelength of said optical source.

7. The optical recording system of claim 5 wherein said low frequency system degradation is a change in a surface sensitivity of said optical media.

8. The optical recording system of claim 2, wherein said second type of variation in said error signal results from a low frequency system degradation, and said high frequency and said low frequency system degradations occur simultaneously.

9. The optical recording system of claim 1 wherein said means for controlling said optical source by providing a partial correction of said error signal includes providing a deadband of values around said target value such that said mark formation effectiveness signal may only take on values in said deadband.

10. The optical recording system of claim 1 wherein said means for controlling said optical source by providing a partial correction of said error signal includes a variable gain servo loop having a variable gain stage for receiving said error signal from said error signal generating means and providing a variable amount of amplification for said error signal.

11. The optical recording system of claim 1 wherein said means for controlling said optical source by providing a complete correction of said error signal further includes a low speed servo loop responsive to peaks in said error signal.

12. The optical recording system of claim 11 wherein said low speed servo loop further includes:
   a peak sampler for measuring peaks in said mark formation effectiveness signal;
   a signal combiner for measuring a difference between said peaks and said target value of said mark formation effectiveness signal to provide a peak error;
   a gain stage for amplifying said peak error to provide a scaled peak error;
   means for combining said scaled peak error with a previous error correction value previously generated by said loop;
   a loop switch for providing said scaled peak error to a driver of said optical source; and
   means for storing said scaled peak error to be used in a subsequent iteration of said low speed servo loop.

13. The optical recording system of claim 12 wherein said peak sampler takes a plurality of samples of said error signal and determines the maximum of 128 of said samples taken in 1.0 milliseconds.

14. A method of recording data on an optical recording medium, said method comprising:
   supplying an incident write signal to said medium from an optical source, said incident write signal including at least one incident write pulse, such that a logic level of said data may be recorded on said medium during said pulse as a mark having a distinct reflectivity;
   detecting a reflection of said incident write signal from said medium to provide a reflected write signal, said reflected write signal including a reflected write pulse corresponding to said incident write pulse;
   generating a mark formation effectiveness signal from said reflected write pulse, said mark formation effectiveness signal generator providing an indication of the quality of said mark;
   generating an error signal from said mark formation effectiveness signal and a target value of said mark formation effectiveness signal; and
   controlling a write power level of said optical source by providing a partial correction of a first type of variation in said error signal and a full correction of a second type of variation in said error signal.

15. The method of claim 14 wherein said first type of variation in said error signal results from a high frequency system degradation.

16. The method of claim 14 wherein said second type of variation in said error signal results from a low frequency system degradation.

17. The method of claim 15, wherein said second type of variation in said error signal results from a low frequency system degradation, and said high frequency and said low frequency system degradations occur simultaneously.

18. The method of claim 14 wherein said step of controlling said optical source by providing a partial correction of said error signal includes providing a variable gain servo loop.

19. The method of claim 14 wherein said step of controlling said optical source by providing a complete correction of said error signal further includes a low speed servo loop responsive to peaks in said error signal.

20. The method of claim 19 wherein said low speed servo loop further includes:
- a peak sampler for measuring peaks in said mark formation effectiveness signal;
- a signal combiner for measuring a difference between said peaks and said target value of said mark formation effectiveness signal to provide a peak error;
- a gain stage for amplifying said peak error to provide a scaled peak error;
- means for combining said scaled peak error with a previous error correction value previously generated by said loop;
- a loop switch for providing said scaled peak error to a driver of said optical source; and
- means for storing said scaled peak error to be used in a subsequent iteration of said low speed servo loop.

* * * * *